(12) United States Patent
Grabania et al.

(10) Patent No.: US 7,891,620 B2
(45) Date of Patent: Feb. 22, 2011

(54) MOUNT FOR MOVING OF A DISPLAY

(75) Inventors: Bogdan Grabania, Kraków (PL); Kamil Sienkiel, Ostrowiec ÿwiÿtokrzyski (PL)

(73) Assignee: Peerless Industries, Inc., Aurora, IL (US)

( * ) Notice: Subject to any disclaimer, the term of this patent is extended or adjusted under 35 U.S.C. 154(b) by 0 days.

(21) Appl. No.: 12/479,357

(22) Filed: Jun. 5, 2009
(Under 37 CFR 1.47)

(65) Prior Publication Data
US 2010/0090077 A1      Apr. 15, 2010

Related U.S. Application Data

(60) Provisional application No. 61/060,625, filed on Jun. 11, 2008.

(51) Int. Cl.
*E04G 3/00* (2006.01)
(52) U.S. Cl. .................. 248/285.1; 248/298.1; 248/919
(58) Field of Classification Search ............. 248/298.1, 248/274.1, 282.1, 285.1, 917, 919
See application file for complete search history.

(56) References Cited

U.S. PATENT DOCUMENTS

| | | | |
|---|---|---|---|
| 5,217,181 A * | 6/1993 | Hammarskjold et al. .... | 248/424 |
| 5,353,902 A | 10/1994 | Flowtow et al. | |
| 5,401,089 A | 3/1995 | Inagaki et al. | |
| 5,583,735 A | 12/1996 | Pease et al. | |
| 5,847,685 A | 12/1998 | Otsuki | |
| 5,941,615 A | 8/1999 | Ito et al. | |
| 5,974,643 A | 11/1999 | Hays et al. | |
| 6,005,641 A | 12/1999 | Ui | |
| 6,012,785 A | 1/2000 | Kawasaki | |
| 6,149,253 A | 11/2000 | Talasani | |
| 6,158,359 A | 12/2000 | Allan et al. | |
| 6,344,968 B2 | 2/2002 | Kim et al. | |
| 6,416,027 B1 | 7/2002 | Hart | |
| 6,442,030 B1 | 8/2002 | Mammoser et al. | |
| 6,480,161 B2 | 11/2002 | Watson | |
| 6,484,993 B2 | 11/2002 | Huffman | |
| 6,510,049 B2 | 1/2003 | Rosen | |
| 6,517,131 B1 | 2/2003 | Haataja | |
| 6,559,806 B1 | 5/2003 | Watson | |

(Continued)

FOREIGN PATENT DOCUMENTS

DE      102 62 039 B4      5/2006

(Continued)

OTHER PUBLICATIONS

U.S. Appl. No. 11/999,295, filing Dec. 4, 2007, Holbrook et al.

*Primary Examiner*—Ramon O Ramirez
(74) *Attorney, Agent, or Firm*—Foley & Lardner LLP

(57) ABSTRACT

A moveable mount equipped with a motor drive set that comprises a motor and a gear that make one or more axles with attached arms move in a linear manner along longer sides coupled to the casing and, simultaneously, rotate during linear relocation, and where the motor along with the drive transmitting elements are placed in the casing of the mount. In an embodiment, the driving power is simultaneously transmitted by a cable from the motor to the pair of slides with one or more blocks situated on one or more slides in which the arms and the axles are mounted in a rotary manner.

14 Claims, 6 Drawing Sheets

U.S. PATENT DOCUMENTS

| | | | |
|---|---|---|---|
| 6,565,167 B1 | 5/2003 | Miller et al. | |
| 6,680,843 B2 | 1/2004 | Farrow et al. | |
| 6,726,164 B1 | 4/2004 | Baiza et al. | |
| 6,738,094 B1 | 5/2004 | Minami et al. | |
| 6,814,009 B2 | 11/2004 | Acevedo et al. | |
| 6,955,447 B2 | 10/2005 | Lui | |
| 7,111,814 B1 | 9/2006 | Newman | |
| 7,187,554 B2 | 3/2007 | Seki et al. | |
| 7,296,774 B2 | 11/2007 | Oh | |
| 7,448,584 B2 * | 11/2008 | Chen et al. | 248/278.1 |
| 2005/0127253 A1 * | 6/2005 | Kim | 248/176.1 |
| 2006/0016941 A1 | 1/2006 | Choi et al. | |
| 2006/0037426 A1 | 2/2006 | Teller | |
| 2006/0175476 A1 | 8/2006 | Hasegawa et al. | |
| 2007/0030647 A1 | 2/2007 | Chen et al. | |
| 2007/0053151 A1 * | 3/2007 | Capoferri et al. | 361/686 |
| 2007/0096606 A1 | 5/2007 | Ryu | |
| 2007/0125917 A1 * | 6/2007 | Oh et al. | 248/176.1 |
| 2007/0146987 A1 | 6/2007 | Sakata et al. | |
| 2007/0158515 A1 | 7/2007 | Dittmer et al. | |
| 2007/0181762 A1 * | 8/2007 | Dittmer | 248/274.1 |
| 2007/0200962 A1 | 8/2007 | Choi et al. | |
| 2007/0258200 A1 | 11/2007 | Choi et al. | |
| 2007/0262627 A1 | 11/2007 | Clapper et al. | |
| 2007/0279519 A1 | 12/2007 | Sukenari et al. | |
| 2009/0057514 A1 * | 3/2009 | Oh | 248/282.1 |
| 2009/0078841 A1 * | 3/2009 | Oddsen, Jr. | 248/279.1 |
| 2010/0123061 A1 * | 5/2010 | Vlies | 248/220.1 |

FOREIGN PATENT DOCUMENTS

| | | | |
|---|---|---|---|
| EP | 1 852 645 A1 | 11/2007 | |
| JP | 2001-222232 | 8/2001 | |
| JP | 3154448 U | * 10/2009 | |
| WO | WO 2004/002282 A2 | 1/2004 | |
| WO | WO 2005/057105 A1 | 6/2005 | |
| WO | WO 2006/068456 A1 | 6/2006 | |
| WO | WO 2007/035770 A1 | 3/2007 | |
| WO | WO 2007/037565 A1 | 4/2007 | |
| WO | WO 2008/051560 A2 | 5/2008 | |

* cited by examiner

MOUNT FOR MOVING OF A DISPLAY

CROSS REFERENCE TO RELATED PATENT APPLICATIONS

The present application claims priority to U.S. Provisional Patent Application No. 61/060,625, filed Jun. 11, 2008, and the contents of which are incorporated herein by reference in their entirety.

FIELD OF THE INVENTION

The present invention relates generally to a mount for extending, tilting and/or rotating of a flat panel display screen, such as a plasma or LCD display.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

There are various conventional mounts for tilting and rotating a flat panel display attached to a surface such as a wall or a piece of furniture in particular. Such mounts use two vertical axles, usually in a form of shafts, placed in a casing, moving along its longer vertical sides and rotating while moving. Extendable arms are attached to the shafts. A mounting plate, configured for mounting to the rear surface of a display screen, is located on the ends of extended arms. Extending of the mount is effected by manually pulling the flat panel display by the user. As a result of applying the force to the flat panel display, the arm ends extend or retract and the shafts move and swivel.

A head for mounting a flat panel display screen, in particular a plasma or LCD TV, is generally known. Such a head may include a self-balancing system of the flat panel display and a portion of the mount. The display can be tilted by using several principally straight guides and surfaces shaped as supports and mounts with sets of moving pivots coupled to the guides to achieve a balanced rolling connection between these surfaces. In the described system, the resultant forces of the set of moving pivots are principally directed perpendicularly to the direction of movement of the pivots and balance the force of the supported weight. Due to the use of numerous sets of guides with every combination of supporting and mounting surfaces, the guides determine the shearing operation mode that limits slide and has a positive impact on the movement of the set of moving pivots along with the guides as well as helps protect the set of pivots from sliding when the user or technician is lifting and removing the display from the mount.

In the conventional mount described above, the movement of the screen along the horizontal axis is effected by manual tilting or lifting which results in relocating the moving pivots along the guides. Relocating the screen around the vertical axis is effected by manual turning which results in turning the head about a vertical axis. Consequently, all movements of the head require application of manual force to the flat panel display.

SUMMARY OF THE INVENTION

Various embodiments of the present invention relate to a mount for extending, tilting and rotating a flat display screen, in particular a plasma or LCD TV display. In particular, a motor drive for automated movement of a display mount from a retracted orientation, where the display device is disposed proximate a mounting surface, to an extended orientation where the display device is disposed a distance from the mounting surface, is provided. The mount may further be configured to accommodate tilting and rotation of the display device.

The mount for extending and retracting a flat display according to an embodiment of the present invention is equipped with a casing that is attachable to a load-bearing surface, a room wall or a surface of a piece of furniture. Two axles placed in the casing, which may be configured to move along a plane parallel to the mounting surface and rotate while moving. Extendable arms are attached to the axles. A display device may be mounted to a pivot that is operatively coupled to the ends of the extendable arms, opposite the two axles.

The mount may be equipped with a motor drive set comprising a motor, drive shaft and a gear assembly that operates to move the axles with attached extendable arms in a linear manner along the longer horizontal sides of the casing and, while simultaneously, rotating the axles. The motor along with the drive transmitting elements may be placed in the casing of the mount.

In an embodiment, driving power from the motor drive set is transmitted by a string or cable from the motor to a pair of slides that are operatively coupled to a plurality of blocks disposed in the slides. Each of the slides are moveably coupled to a first track The axles may also be rotatably mounted in the slides. The slides move in a track situated in the casing. A second pair of slides is moveably coupled to a second track. Each of the slide blocks retain a clearance that makes it possible to relocate them inside the slides.

One or more cranks may be mounted to the slides with one end of the crank attached to the slides and the other end attached to a flange of the axle. The cable comprises as a toothed belt in an embodiment. The motor drive set and the gear assembly may be placed near the bottom of the mount and drive the first pair of slides. It is also possible to use a different layout and drive the second pair of slides.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF EMBODIMENTS

Figure 1:
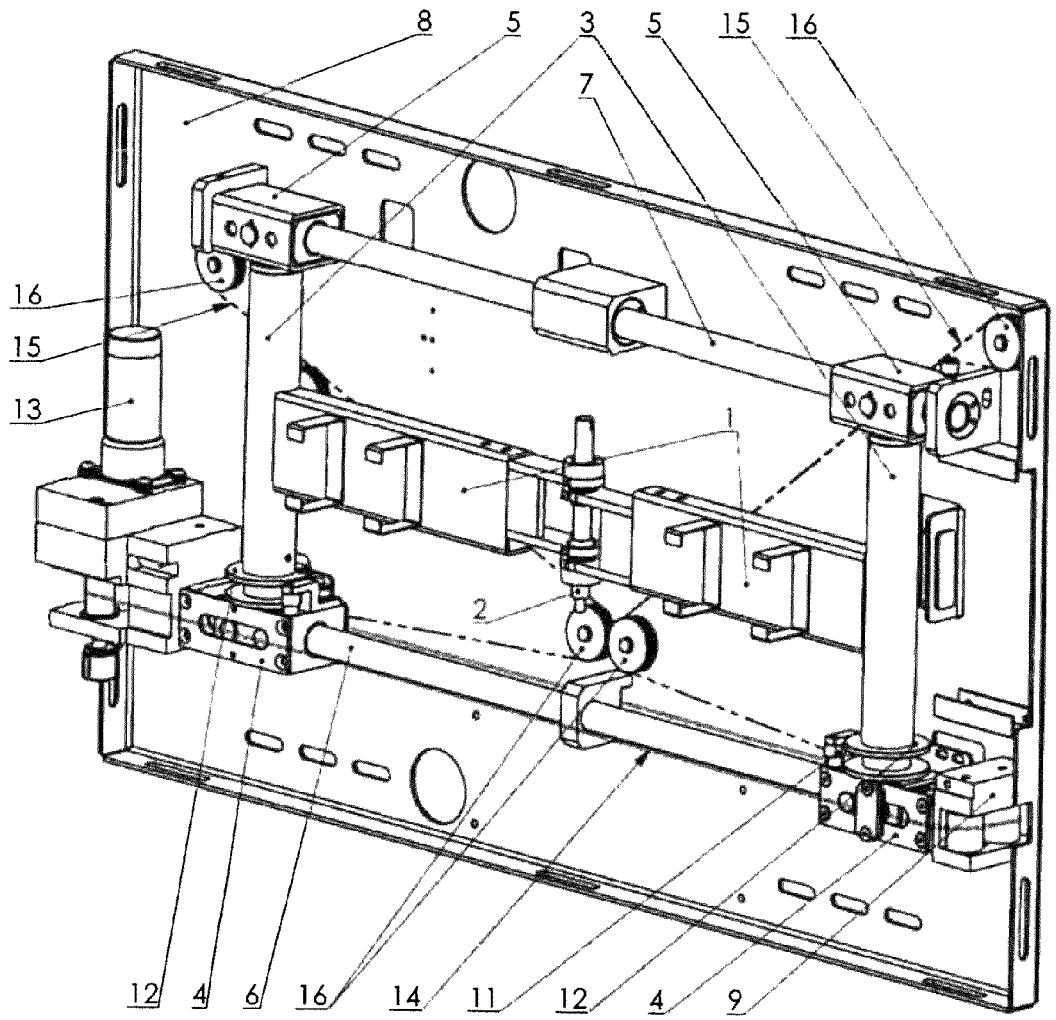
FIG. 1 is an embodiment of the mount of the present invention with retracted arms in a perspective view.
Figure 2:
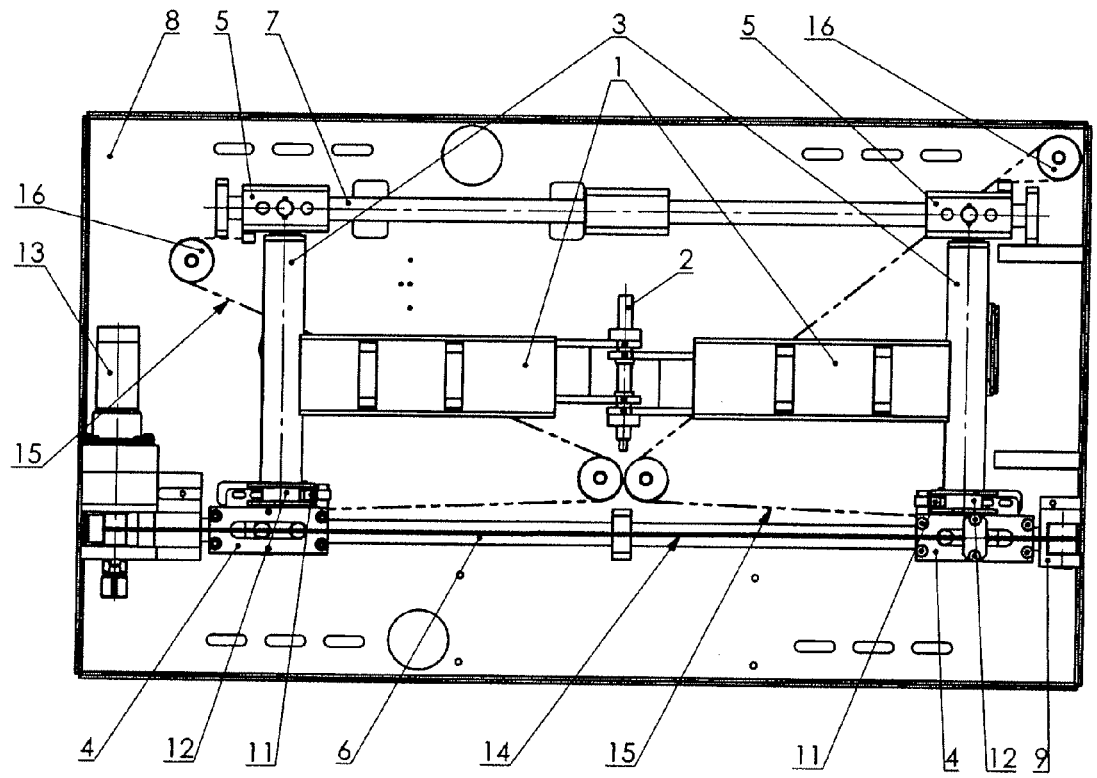
FIG. 2 is a front plan view of the mount of FIG. 1 with retracted arms.

With reference to FIGS. 1-6, a mount for a display device according to an embodiment of the present invention is depicted. The mount comprises a casing 8 that is configured such that it may be attached to a mounting surface, including a room wall or a surface of a piece of furniture.

Two or more axles 3 may be operatively coupled to the casing 8. The axles 3 are configured to translate along a portion of the casing 8, in a plane substantially parallel to the mounting surface. In an embodiment, the axles 3 translate along the longer horizontal axis of the casing 8. As the axles 3 translate, they simultaneously rotate about their respective axis, which may be orientated substantially normal to the direction of translation of the axles 3. Mounted to the axles 3, may be a plurality of arms 1 and opposite the axles 3 is a pivot 2 that couples at least two of the plurality of arms 1.

The pivot 2 is configured to mount an object such as a display device (not shown) by its vertical back wall or via an additional mounting head attachable to the display device. The mount may be equipped with a motor drive set, comprising a motor 13, drive shaft and a gear. The axles 3 with the attached arms 1 move in a linear manner within the casing 8 in response to rotation of the drive shaft by the motor 13. At the same time, the axles 3 may rotate during linear relocation. The motor 13, along with the drive transmitting elements, may be placed in the casing of the mount.

A plurality of arms 1 are selectively moveable in relation to the casing and are configured to operatively mount to a display screen (not shown). As depicted, the mount may include a pair of arms 1. Each of the arms comprises a first end and a second end. The plurality of arms 1 may be pivotally attached to each other at respective second ends of each of the arms 1. The arms 1 may be connected by a hinge in an embodiment, forming a pivot 2 The pivot 2 may be configured to operatively couple to an object such as a flat panel display or an adapter configured for attachment to the object. For example, the adapter may comprise a display mounting bracket, which may include a head coupled to the pivot 2 and tiltable about a substantially vertical plane and/or rotatable about a substantially horizontal plane.

The plurality of arms 1 along with the pivot 2 define the extension and retraction of the object such as the display device from the casing 8. As described in detail below, the pivot 2 may be translated in a direction substantially normal to the mounting surface from a retracted orientation, where the pivot 2 is proximate the casing 8, and an extended orientation where the pivot 2 is disposed a distance from the casing 8.

The first end of each of the plurality of arms 1 is operatively coupled to one of the axles 3. Each of the axles 3 is rotatably coupled at a bottom end in one of the bottom slides 4 and may further be rotatably coupled at a top end in one of the top slides 5. Each of the bottom slides 4 and the top 5 are movably coupled to a bottom track 6 and a top track 7, respectively. In an embodiment, the bottom track 6 and the top track 7 comprise shafts. The bottom track 6 and the top track 7 are operatively connected to the casing 8, which may enhance the stiffness of the casing 8 and the overall mount. The mount may further include one or more limiters 9 operatively connected to the casing 8 and which may be equipped with rolls.

Each of the bottom slides 4 include a block 10 mounted such that the block 10 moves along with one of the bottom slides 4 in a linear movement along the bottom track 6. The blocks 10 retain a clearance that makes it possible to relocate them inside the bottom slides 4. A crank 11 may be rotatably coupled to each of the bottom slides 4. A crank 11 may also be rotatably coupled to each of the top slides 5. The cranks 11 move along with the bottom slides 4 and the top slides 5 on the bottom track 6 and the top track 7, respectively. With regard to the lower slides 4, one end of each of the cranks 11 is attached to one of the bottom slides 4, and the other to an axle flange 12, which may be connected to one of the axles 3 in a non-rotary manner.

Extending of the mount, i.e. relocation of the mount along the horizontal axis, is effected by the motor 13 that drives a cable 14. The motor 13 may further comprise a rotatable drive shaft and a gear assembly in various embodiments. In an embodiment, the cable 14 comprises a toothed belt. The cable 14 goes over the rolls of the limiter 9 disposed opposite the motor 13. The motor 13 may be disposed on the side of the mount proximate the bottom track 6 and coupled to the casing 8. The motor 13, in combination with the cable 14, drives one or more of the bottom slides 4 along the bottom track 6. In various embodiments, the motor 13 may be disposed on the casing 8 so that one or more of the top slides 5 moveable coupled to the top track 7 is driven. The bottom slides 4 and the top slides 5 translate between a position proximate the periphery and proximate the center of the casing 8 as can be seen in FIGS. 1 and 3.

The mount may be equipped with one or more lines 15, coupled to one of the bottom slides 4 at a first end and coupled to one of the top slides 5 at a second end. Each of the one or more lines 15 may be routed over one or more rolls 16 rotatably coupled to the casing 8 or to another portion of the mount. The lines 15 may be used to stabilize movement of the blocks 10.

Rotation of the motor 13 and drive shaft drives the cable 14 and results in a linear movement of the bottom slides 4 and the top slides 5 along the bottom track 6 and top track 7, respectively. Rotation of the motor 13 simultaneously draws the bottom slides 4 and the top slides 5 inwardly, translating each of the bottom slides 4 and the top slides 5 toward the center of the mount or outwardly from the center of the mount towards its periphery. Thus, the slides 4 and 5 are disposed substantially opposite to each other. As the bottom slides 4 and the top slides 5 translate toward the center of the mount, the arms 1 extend from a retracted orientation proximate the casing 8, rotating the axles 3 in the bottom slides 4 and the top slides 5, such that the pivot 2 is extended along a substantially horizontal plane away from the casing 8.

Figure 3:
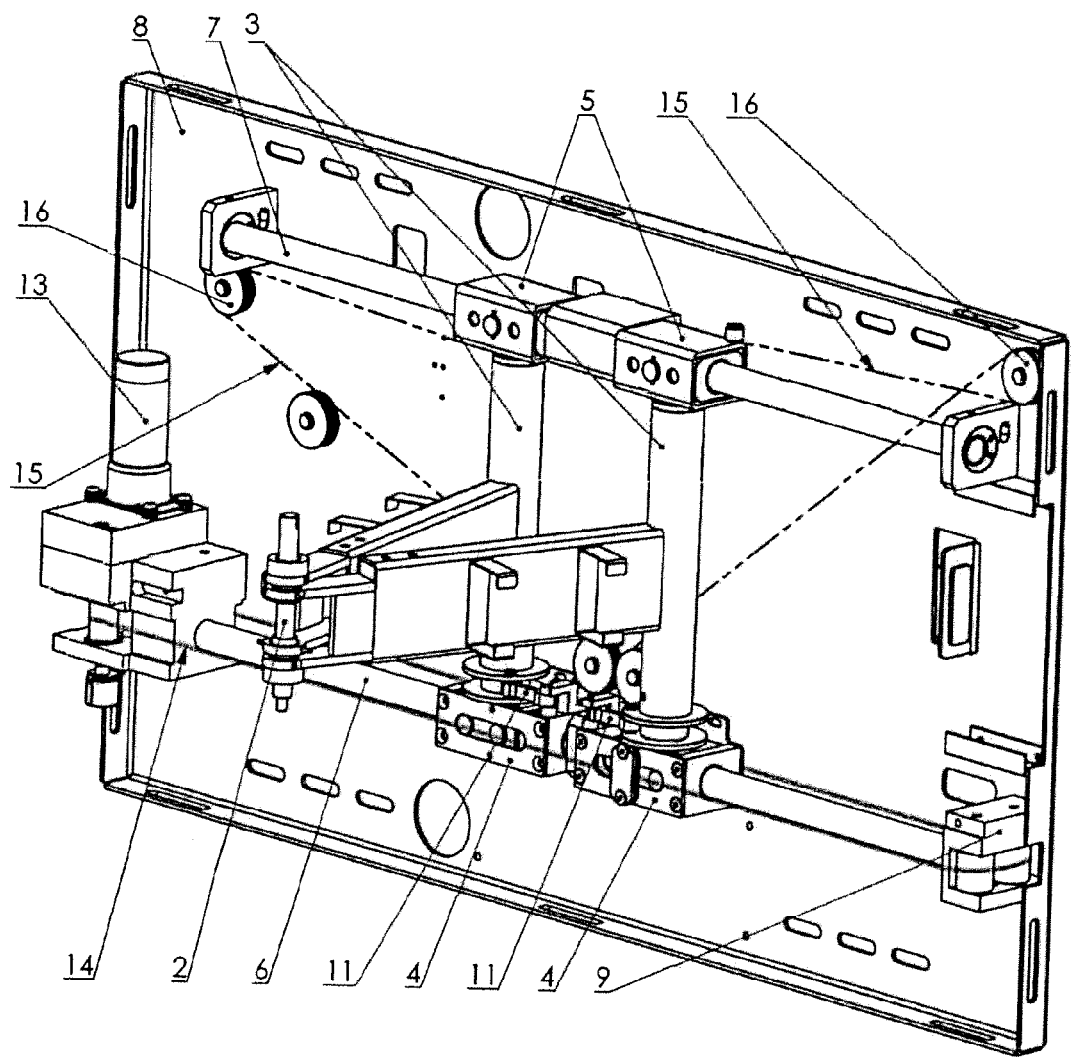
FIG. 3 is a perspective view of the mount of FIG. 1 with extended arms.
Figure 4:
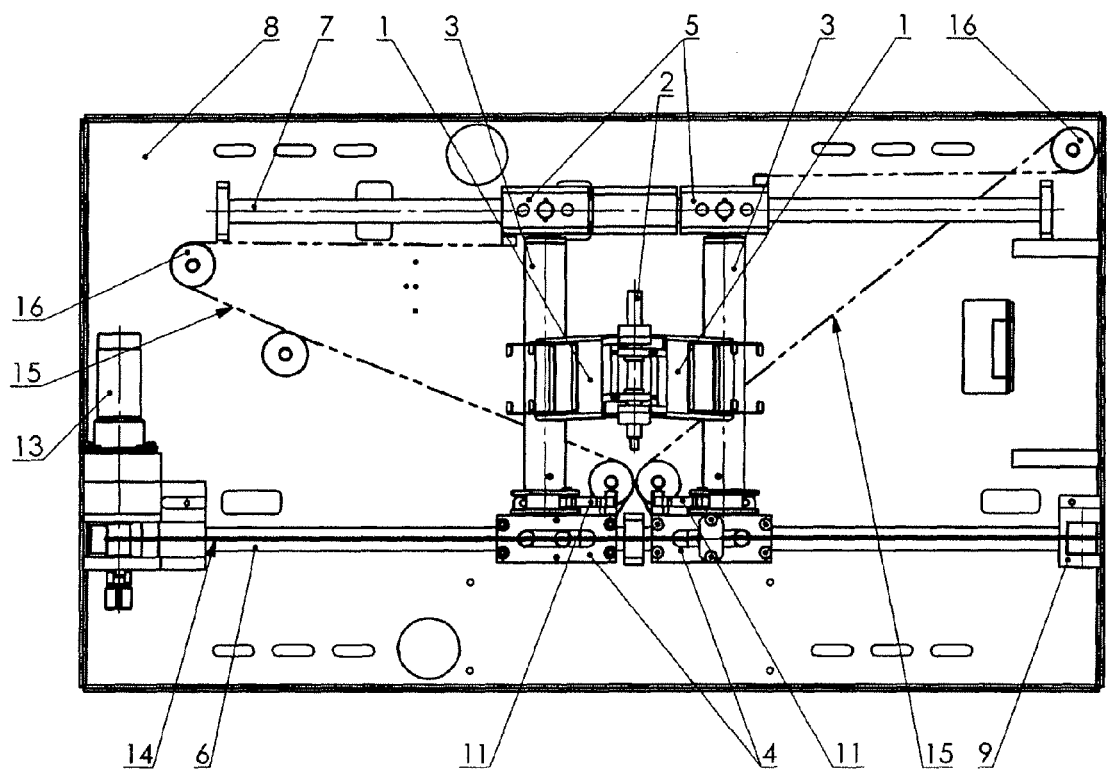
FIG. 4 is a front plan view of the mount of FIG. 1 with extended arms.
Figure 5:
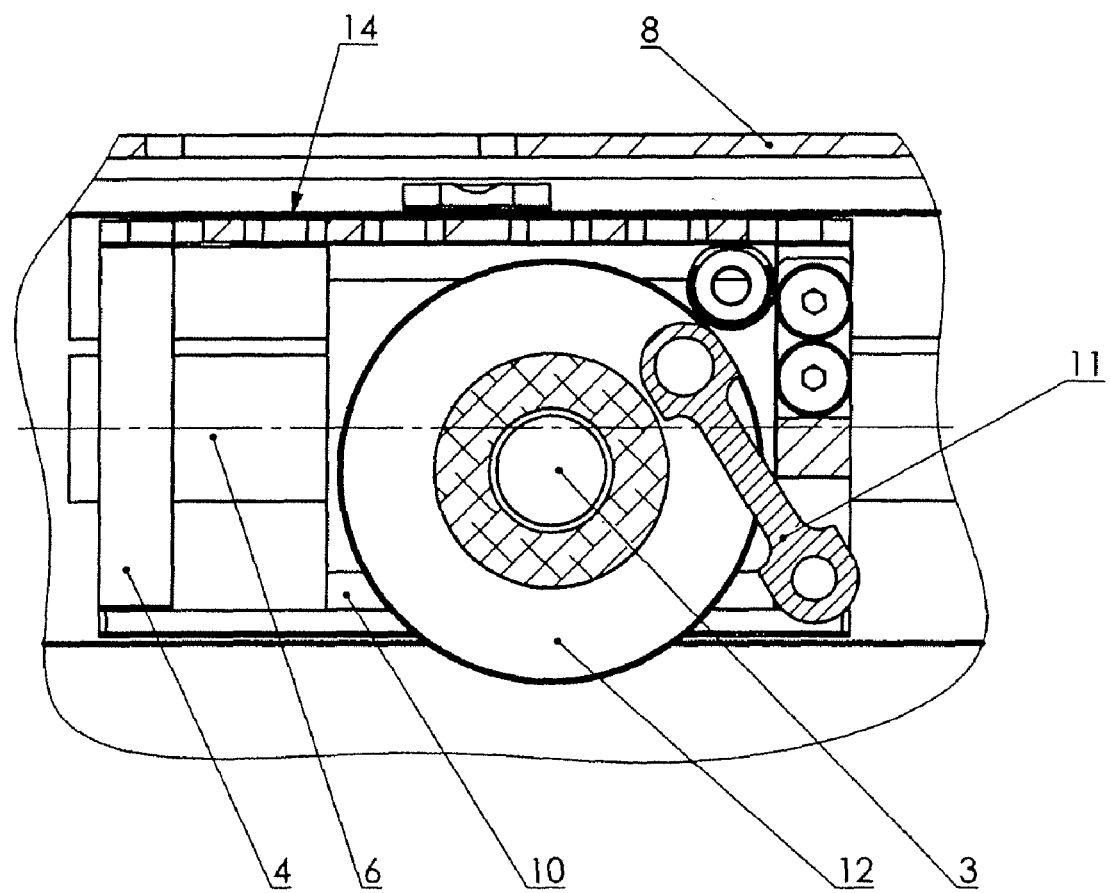
FIG. 5 is a detailed horizontal cross-section of a slide of the mount of FIG. 1 with retracted arms.
Figure 6:
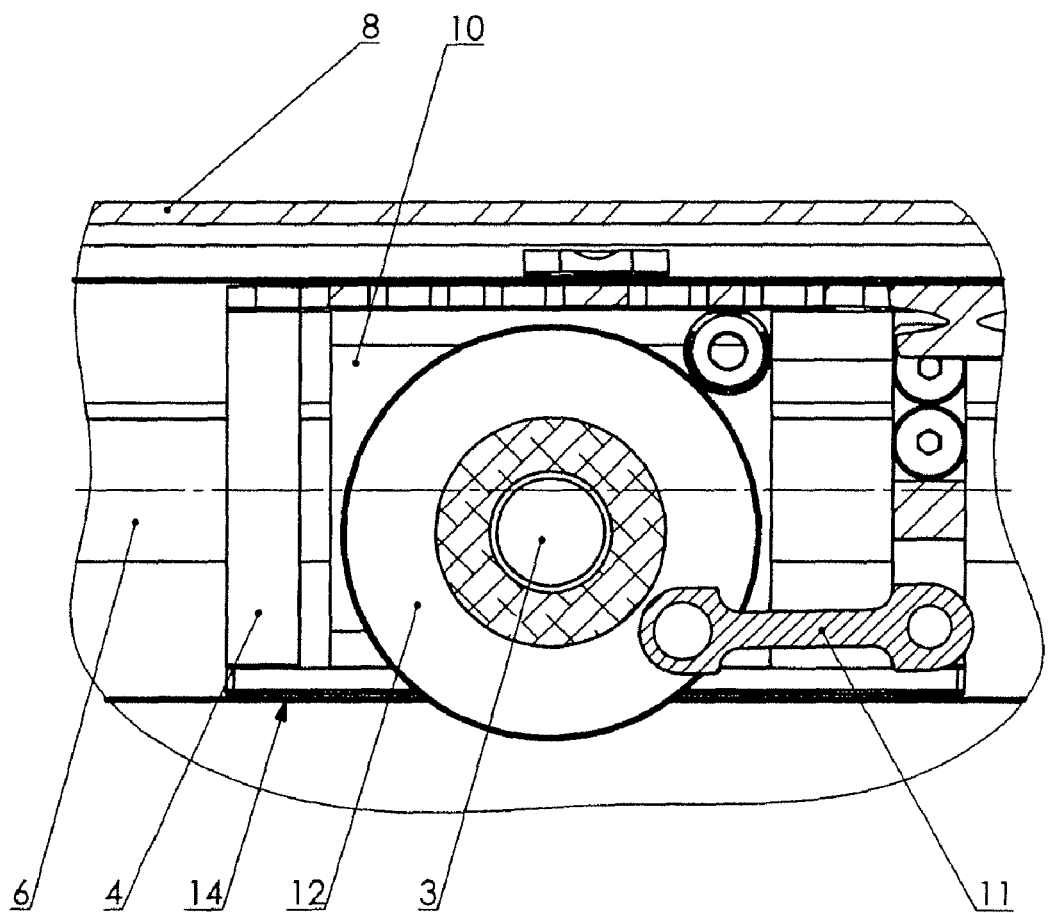
FIG. 6 is a detailed horizontal cross-section of the slide of FIG. 5 with extended arms.

As depicted in FIGS. 1 and 3, the pin of the crank 11 translates the bottom slides 4 and the top slides 5. The axles 3 translates with the bottom slides 4 and the top slides 5 in a linear manner following the bottom track 6 and the top track 7. The bottom slides 4 operate on the crank 11 that rotates the axle flange 12 with the axles 3, to extend the arms 1. In a similar manner, when the bottom slides 4 and the top slides 5 translate toward the periphery of the mount, the pivot 2 is retracted toward the casing 8 from an extended position. As the bottom slides 4 and the top slides 5 approach the periphery of the casing 8, the arms 1 may be fully retracted such that they are in a substantially flat configuration proximate the casing 8.

The layout of the bottom track 6 and the top track 7 make it possible to achieve a synchronized extension of the arms 1 and to avoid their rotation while extending. Further, the rotary movement of the arms 1 simultaneous to extension and return of the pivot 2 makes it possible to extend the arms 1 from a substantially flat orientation in relation to the casing 8 of the mount.

In the above described mount, the driving power may be simultaneously transmitted by a cable 14 from the motor 13 to a pair of bottom slides 4 with blocks 10. The blocks may be situated in the bottom slides 4 and the top slides 5 and operatively coupled to one of the plurality of arms 1. The axles 3 may be mounted in a rotary manner in relation to the bottom slides 4. The mount, may further comprise one or more cranks 11 mounted to and move with the pair of bottom slides 4. One end of each of the cranks 11 may be attached to the one of the pair of bottom slides 4 and the other end may be attached to one of the axle flanges 12. The bottom slides 4 may move in the bottom track 6 situated in the casing 8. The mount may further comprise a second pair of top slides 5 in a top track 7. The blocks 10 may be configured to retain a clearance, making it possible to relocate the blocks 10 inside the bottom slides 4. In an embodiment, the cable 14 may comprise a toothed belt. The mount may be configured with the motor 13 and the gear placed at the bottom of the mount and further configured to drive the bottom slides 4.

LIST OF PARTS 1 arms
2 pivot
3 axles
4 bottom slides
5 top slides
6 bottom track
7 top track
8 casing
9 limiters
10 blocks
11 cranks
12 flanges
13 motor
14 cable
15 line
16 rolls The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A mount assembly for a display device, comprising:
   a casing configured for attachment to a mounting surface, the casing characterized by a central portion and a periphery;
   a first track operatively connected to the casing;
   a first pair of slides moveably coupled to the first track and moveable along a first axis;
   an axle rotatably coupled to each of the first pair of slides, each of the axles rotatable about a second axis orientated substantially normal to the first axis;
   a first arm having a first end and a second end, the first end of the first arm operatively coupled to one of the axles;
   a second arm having a first end and a second end, the first end of the second arm operatively coupled to another of the axles, and the second end of the second arm rotatably coupled to the second end of the first arm and defining a pivot;
   a motor including a drive shaft operatively coupled to at least one of the first pair of slides and configured to selectively translate each of the first pair of slides along the first axis upon rotation of the drive shaft;
   a second track operatively connected to the casing; and
   a second pair of slides moveably coupled to the second track and moveable along a third axis, the third axis substantially parallel to first axis,
   wherein upon translation of the first pair of slides in a first direction, the pivot extends away from the mounting surface, and wherein one of the axles is rotatably coupled to one of the second pair of slides, and the other axle is rotatably coupled to the other of the second pair of slides.

2. The mounting assembly of claim 1, further including a cable rotatably coupled to the drive shaft and at least one of the first pair of slides.

3. The mounting assembly of claim 2, wherein the cable comprises a toothed belt.

4. The mounting assembly of claim 1, further comprising at least one line operatively coupled to one of the first pair of slides and one of the second pair of slides.

5. The mounting assembly of claim 1, wherein rotation of the drive shaft translates each of the first pair of slides in a second direction along the first axis causing the pivot to retract toward the mounting surface.

6. The mounting assembly of claim 1, further comprising a head operatively connected to the pivot, the head configured for operative attachment to the display device.

7. A motorized mount for mounting a display device to a surface, comprising:
   a casing configured for attachment to a surface;
   a plurality of arms, each of the plurality of arms operatively and moveably coupled to the casing, at least two of the plurality of arms further rotatably coupled to each other opposite the casing forming a pivot;
   a motor operatively coupled to at least one of the plurality of arms;
   a first track operatively connected to the casing;
   a first slide and a second slide, each of the first and the second slides moveably coupled to the first track;
   a first axle rotatably coupled to the first slide and operatively coupled to one of the plurality of arms opposite the pivot;
   a second axle rotatably coupled to the second slide and operatively coupled to another of the plurality of arms opposite the pivot;
   a toothed belt operatively coupled to the motor and at least one of the first slide and the second slide;
   a second track operatively connected to the mounting surface and substantially parallel to the first track;
   a third slide and a fourth slide, each of the third and the fourth slides moveably coupled to the second track; and
   a line operatively connected to at least one of the first and the second slides and further operatively connected to at least one of the third and the fourth slides,
   wherein operation of the motor causes each of the plurality of arms to slide in a first plane substantially parallel to the surface and rotate about a first axis substantially parallel to the surface thereby translating the pivot in a direction substantially normal to the first plane.

8. The motorized mount of claim 7, further comprising a head operatively connected to the pivot, the head configured for operative attachment to the display device, wherein the orientation of the head is selectively adjustable in relation to the pivot in at least one of a substantially vertical direction and a substantially horizontal direction.

9. The motorized mount of claim 8, wherein the plurality of arms are configured to translate the head along a substantially horizontally plane extending from the casing in response to operation by the motor.

10. The motorized mount of claim 7, further comprising a belt operatively coupled to the motor and at least one of the plurality of arms.

11. A moveable mounting system for mounting of an object to a surface, comprising:
- a casing configured for attachment to the surface;
- a first axle moveably connected to the casing;
- a second axle moveably connected to the casing;
- a pivot configured to operatively attach to the object;
- a first arm operatively connected to the first axle at a first end of the first arm and rotatably connected to the pivot at a second end of the first arm;
- a second arm operatively connected to the first axle at a first end of the second arm and rotatably connected to the pivot at a second end of the second arm;
- a motor including a drive shaft operatively connected to the casing;
- a cable operatively coupled to the drive shaft and at least one of the first and the second axles and configured to simultaneously rotate and translate the first and the second axles in response to rotation of the drive shaft;
- a first track attached to the casing, a first slide and a second slide, each of the first and the second slides moveably coupled to the first track; and
- a second track attached to the casing, a third slide and a fourth slide, each of the third and the fourth slides moveably coupled to the second track,
- wherein simultaneous translation and rotation of the first and the second axles causes the pivot to move in a direction substantially normal to the surface between a retracted orientation and an extended orientation, wherein the first axle is rotatably coupled to the first slide, and wherein the second axle is rotatably coupled to the second slide, and wherein the first axle is rotatably coupled to the third slide, and wherein the second axle is rotatably coupled to the fourth slide.

12. The moveable mounting system of claim 11, further comprising a first line operatively coupled to the first slide and the third slide, and a second line operatively coupled to the second slide and the fourth slide.

13. The moveable mounting system of claim 11, wherein the pivot is at least partially nested within the casing when in the retracted orientation.

14. The moveable mounting system of claim 11, wherein the object is a flat panel display device.

* * * * *